United States Patent [19]
MacDonald et al.

[11] Patent Number: 5,199,917
[45] Date of Patent: Apr. 6, 1993

[54] SILICON TIP FIELD EMISSION CATHODE ARRAYS AND FABRICATION THEREOF

[75] Inventors: Noel C. MacDonald; James P. Spallas, both of Ithaca, N.Y.

[73] Assignee: Cornell Research Foundation, Inc., Ithaca, N.Y.

[21] Appl. No.: 803,986

[22] Filed: Dec. 9, 1991

[51] Int. Cl.$^5$ ............................................. H01J 9/04
[52] U.S. Cl. ........................................ 445/24; 445/50; 313/336; 313/351
[58] Field of Search ............................ 445/24, 50, 51; 313/309, 311, 336, 351

[56] References Cited
U.S. PATENT DOCUMENTS

| | | |
|---|---|---|
| 3,453,478 | 7/1969 | Shoulders et al. |
| 3,755,704 | 8/1973 | Spindt et al. |
| 3,789,471 | 2/1974 | Spindt et al. |
| 3,814,968 | 6/1974 | Nathanson et al. |
| 3,921,022 | 11/1975 | Levine |
| 3,970,887 | 7/1976 | Smith et al. |
| 4,095,133 | 6/1978 | Hoeberechts |
| 4,178,531 | 12/1979 | Alig |
| 4,575,765 | 3/1986 | Hirt |
| 4,721,885 | 1/1988 | Brodie |
| 4,940,916 | 7/1990 | Borel et al. |
| 4,943,343 | 7/1990 | Bardai et al. |
| 4,964,946 | 10/1990 | Gray et al. |
| 4,983,878 | 1/1991 | Lee et al. |

OTHER PUBLICATIONS

"Formation of Submicron Silicon-on Insulator Structures by Lateral Oxidation of Substrate-Silicon Islands" Arney et al. J. Vac. Sci. Technol. B 6 (1) Jan./Feb. 1988 1988 American Vacuum Society pp. 341-345.
"Self-Aligned Silicon-Strip Field Emitter Array" Spallas et al.; Inst. Phys. Conf. Ser. No. 99: Section 1 Paper presented at 2nd Int. Conf. on Vac. Microelectron, Bath, 1989, pp. 1-4.
"TEM Characterization of Defect Configurations in Submicron SOI Structures", Theodore et al.; Preprint: Proc. 6th Int. Conf. on Microscopy of Semiconducting Materials Oxford, UK 10-13 Apr. 1989 pp. 551-556.
"A Fully Depleted Lean-Channel Transistor (DELTA) A Novel Vertical Ultrathin SOI MOSFET" Hisamoto; Manuscript received Sep. 6, 1989; Central Research Laboratory, Hitachi Ltd. IEEE Log Number 8933301, 1990 IEEE.
"Field Emitter Tips for Vacuum Microelectronic Devices" Chin; J. Vac. Sci. Technol. A 8 (4) Jul./Aug. 1990 pp. 3586-3590.
"Triode Operation of a Vacuum Tansistor", Busta et al. IEDM 91-213-215.

Primary Examiner—Richard K. Seidel
Assistant Examiner—Jeffrey T. Knapp
Attorney, Agent, or Firm—Jones, Tullar & Cooper

[57] ABSTRACT

Through a silicon fabrication process, an emitter tip array is produced by electron beam or other suitable submicrometer scale lithography for precise location of the emitters. The emitter tips are formed by an oxidation process which ensures accurate and precise formation of tips having uniform radii. The process also utilizes the oxidation step to precisely align gate electrode apertures with respect to corresponding emitter tips so that large arrays can be formed with great accuracy and reliability.

17 Claims, 7 Drawing Sheets

SILICON TIP FIELD EMISSION CATHODE ARRAYS AND FABRICATION THEREOF

BACKGROUND OF THE INVENTION

The present invention relates, in general, to the fabrication of vacuum microelectronic devices, and more particularly, to field emission tips having closely spaced, aligned gate electrodes, and to a method for fabricating the same.

Field emission sources of electrons, and more particularly, electron sources utilizing a plurality of conically shaped controllable electron emitters arranged in arrays or patterns are well known in the art, for it has been well established that electron emission can be stimulated by an electric potential applied near a cathode which tapers to a fine point. Such field emitters can be broadly categorized by the type of material used for fabrication. One such category includes the use of semiconductor material such as silicon or germanium to construct arrays of such emitters, while another category encompasses the use of sharply pointed metallic field emitters which utilize individual needle-like protuberances deposited on an electrode. Deposited metallic emitters suffer from at least two major disadvantages. First, the use of deposition techniques to form the pointed shapes limits the area over which uniform arrays can be formed, for such techniques require that a source of emitter material be directed onto a surface essentially normal to that surface while at the same time directing a source of masking material onto the same surface at a shallow grazing angle. This is a very critical operation which does not lend itself to the formation of large quantities of emitter elements over large surfaces, principally because it is extremely difficult to obtain uniformity in the emitters. It is important that each emitter element in an array have essentially the same electron emission characteristics if the emitter array is to produce satisfactory results. However, a 10% variation in the radius of an emitter tip can result in a 300% change in current emission from that tip, and accurate control of the tip radius is difficult to achieve with deposition techniques. A further problem is that the fabrication of such prior devices entails the use of thin film techniques which produce relatively delicate nonuniform structures that are sensitive to the strong electrical forces characteristic of field emission.

A problem common to both categories of emitter is due to the fact that in order to control the emission of electrons from such emitter arrays, gate electrodes are needed above, below, or near the emitter elements. The gates allow appropriate voltages to be applied between the emitters, the gate electrodes and an anode located above the emitters and gates so that the flow of electrons from the emitters is controllable. To allow electron flow from the emitter tips to the anode or collector electrodes, holes typically are formed in a gate electrode metal layer above or around the emitters. The size and precise location of the holes, and the voltage applied to the gate electrode, control not only the magnitude of the electron emission from the emitter, but also determine the shape of the emitted electron flow pattern and can determine the direction of the electron beam emitted from the emitter array. The hole size and its proximity to the emitter determine the voltage required for control of the current from the emitter, while the alignment of the axis of the hole with respect to the axis of the emitter determines the direction of the current beam from the emitter. However, precise alignment and hole size control has been very difficult to achieve in the prior art because of the very small geometries and tolerances in the devices. Typically, in order to obtain precise alignment it has been necessary to employ a difficult and time-consuming masking step, but even slight errors in the mask have created serious problems. The difficulties encountered in fabricating such arrays increase significantly as the dimensions of the emitters and the emitter arrays are decreased to the submicrometer or nanometer scale. Various approaches to the fabrication of such devices are described, for example, in U.S. Pat. Nos. 3,789,471, 3,921,022, 4,095,133 and 4,940,916.

Conventional field emission cathodes usually operate at very large potentials, typically greater than 10 Kv, or operate at very high temperatures, often in excess of 500° C., or both. These requirements made them unsuitable for many applications, particularly in microstructures which are very sensitive to both voltage and temperature.

SUMMARY OF THE INVENTION

It is, therefore, an object of the present invention to provide a method for fabricating field emission cathode arrays which overcomes the fabrication difficulties encountered in the prior art.

It is another object of the invention to provide a fabrication technique for the formation of field emission cathode arrays which will provide improved uniformity of emission and improved emission control.

Another object of the invention is to provide a method of fabricating field emission cathode arrays utilizing a plurality of emitter tips, wherein uniformity of tip radius is achieved over large arrays.

It is still another object of the invention to provide a method of fabricating control gate electrodes for field emission cathode arrays, wherein the gate electrodes include apertures aligned with corresponding cathode emitter tips, and wherein the size and alignment of the apertures is accurately controllable.

Another object of the present invention is the provision of a fabrication technique for field emission cathodes and their associated control gates, wherein the cathode tip radius, the size of the control gate aperture, and the alignment of the gate aperture with respect to the cathode tip are independently controllable to provide a field emission array having uniform emitter tips which are accurately sized and positioned in height relative to the aperture and which are aligned with gate electrode apertures.

The foregoing objects are attained, in accordance with the present invention, through a silicon fabrication process in which an emitter tip array is produced by electron beam or other suitable submicrometer scale lithography for precise location of the emitters, and in which the emitter tips are formed by an oxidation process which ensures accurate and precise formation of tips having uniform radii. The process also utilizes the oxidation step to precisely align gate electrode apertures with respect to corresponding emitter tips so that large arrays can be formed with great accuracy and reliability.

In accordance with the present invention, an electron emitter source consisting of at least one, and preferably an array of emitter tips surrounded by a closely-spaced and accurately aligned electrode is provided, whereby accurate control of electron emission can be obtained. The tips and their aligned electrodes are produced by a fabrication process wherein a plurality of silicon islands surrounded by channels or trenches are formed in a silicon substrate, with the islands being supported by corresponding vertical tapered silicon pedestals which extend upwardly from, and are integral with, the substrate. The pedestals are formed with a narrow neck portion where they adjoin their corresponding islands, so that subsequent oxidation of the pedestals separates the silicon islands from the pedestals at the neck portion. This oxidation step shapes the tapered pedestal to form upper and lower opposed, spaced apart and aligned silicon tips in the islands and in their corresponding pedestals, respectively, within the oxide layer, the islands being held in place by the oxide. The oxidation step also provides a uniform layer of oxide on the pedestals, or lower tips, and on the horizontal surface of the substrate between the tips. The silicon tips formed by this oxidation step are the emitter tips for the array, and the shape of the tip is a critical factor in providing a uniform emission from the emitter array. Since the oxidation of the pedestals advances uniformly from all sides of the pedestal, the silicon material "shrinks" uniformly. The process continues until all of the silicon in the region of the narrow neck portion has been oxidized, with the result that the tapered silicon material terminates in a small tip having a diameter of less than 20 nm. The oxidation process is uniform throughout the array so that all of the emitters will be the same size with the same tip diameter. Thereafter, a layer of gate electrode metal is deposited on the horizontal oxide layer between the tips, with the metal surrounding the individual tips and being spaced therefrom by the thickness of the oxide layer on the tips so that apertures are formed in the metal in exact alignment with the tips. In addition, the metal is spaced above the surface of the substrate by the oxide layer. Thereafter, the oxide layer is etched to lift off the islands and their included upper tips and further to remove the layer of oxide on the pedestals to thereby expose cone-shaped, tapered tips. The oxide etching step also removes a selected portion of the oxide from the substrate surface by undercutting the gate electrode metal adjacent the tips. This undercutting leaves oxide support pillars between adjacent tips and beneath the gate metal to support the gate metal and hold it securely in place so that the apertures remain in alignment with respect to the tips.

Because the gap between the surface of a tip and the edge of its corresponding gate electrode aperture is determined by the thickness of the oxide layer formed on the pedestals, and since that thickness can be carefully controlled, not only can the gate electrode metal be spaced very close to the surfaces of the tips, but since the oxide layer is uniform around the circumference of each tip and throughout the array, the edges of the apertures in the metal will be uniformly spaced around each tip and the gaps will be equal at all the tips. In addition, the side walls of the apertures in the gate electrode metal will be sloped so as to be parallel to the surfaces of the conical tips which they surround, thereby further ensuring accurate alignment and accurate spacing. This perfect alignment of the apertures in the electrode metal and the uniform gap between the edges of the apertures and the tip further helps to provide an accurately controllable emission array.

In another embodiment of the invention, the gate electrode layer not only is deposited on the horizontal surface of the oxide between the tip pedestals, but in addition is deposited, as by sputter deposition of TiW, on the sides of the pedestals, so that the metal extends up to the islands, to completely cover the pedestals. An aluminum mask is then deposited over the gate electrode layer to define an aperture surrounding each tip, and a plasma etch removes the gate metal layer in the defined aperture. Thereafter, an etching step removes the oxide layer to lift off the islands, leaving an exposed conical emitter surrounded by an upwardly-sloping gate electrode "dimple". The dimple has an aperture which is perfectly aligned with, and concentric to, the emitter tip, with the diameter of the aperture being selected by the masking step to be as small as desired, the size of the aperture being limited only by the minimum diameter of the oxide at its narrowest part, adjacent the island.

It will be understood that the gate electrode metal layer can be patterned in a conventional manner to form contact pads and boundaries for arrays of tips for controllable emission, as desired. Furthermore, the tips can be encapsulated with a suitable metal for improved emission characteristics.

Micro-cathode emitting tips fabricated using the process of the present invention have a number of outstanding and unique characteristics. First, the tips are formed through the use of a high temperature thermal oxidation which provides tips which are uniform in height and which have very small, uniform radii. Furthermore, the tips formed using this technique are relatively free of defects. The islands formed during this process carry a dielectric cap which serves as an ideal mask for self aligning the deposition of the gate metal layer and permit the formation of perfectly aligned gate electrodes with aperture diameters as small as one micrometer or less. Very large arrays of cathodes can be fabricated using this technique, and the vertical placement of the tip with respect to the plane of the gate electrode metal can be varied.

Although the invention is described herein as providing an array of emitters, the process is capable of providing single electrodes which may be fabricated, for example, on a movable microstructure to provide a scanning electron microscope. The illustrated array of emitters can be formed in dense pattern to provide high current emission at low voltages, while the gate electrode layer is capable of being patterned to provide control not only for groups of emitters, but for single emitters if desired. Such emitters or groups of emitters can be electrically activated in patterns to provide images or in selected sequences to provide scanning, for example, and can be used to provide electron beams which can be electrically deflected, as in a cathode ray tube. Further, although the preferred mode of the invention contemplates the fabrication of conical emitter tips, it is also possible to form the emitters in elongated wedge shapes, or other shapes, as desired.

BRIEF DESCRIPTION OF DRAWINGS

The foregoing and additional objects, features and advantages of the present invention will become apparent to those of skill in the art from the following detailed description of a preferred embodiment thereof, taken in conjunction with the accompanying drawings, in which.

DESCRIPTION OF PREFERRED EMBODIMENTS

In accordance with the present invention, electron-emitting microcathodes are fabricated through the use of nanometer process technology to produce emitters having tips with very small radii and having gate electrodes spaced typically less than one micron from the tip apex. As a result, electron emitters can be operated as cathodes in a field emission device at potentials of less than 100 volts. Furthermore, by fabricating these micro cathodes from silicon, advantage can be taken of the well characterized and understood conventional silicon processing techniques so that very large, densely packed arrays of silicon cathodes can be produced. As a result, large total currents and large current densities, as well as low operating voltages can be achieved.

The present invention is directed to a novel fabrication technique for the formation of silicon tip-type field emission cathodes having self-aligned gate electrodes and, if desired, self-aligned metal encapsulating films. The ability to provide self alignment of the gate electrode and the metal encapsulating film permits construction of field emission cathode tips on a nanometer scale with accuracy and reliability. Although the present invention contemplates, in one embodiment, the use of gold with a chrome adhesion layer for both the gate electrode and the encapsulating metal, in fact other metal films can be used. These films can be deposited using electron beam evaporation, thermal evaporation, or sputter deposition in the processes which is to be described below. Molybdenum and tungsten are ideal films where high temperature use is desired for the field emission cathodes or when removal of silicon oxides in vacuum using a thermal treatment is required. Accordingly, when the following description refers to "metal" in the fabrication process, it will be understood that the foregoing metals are preferred, although others may be used.

Figure 1A:
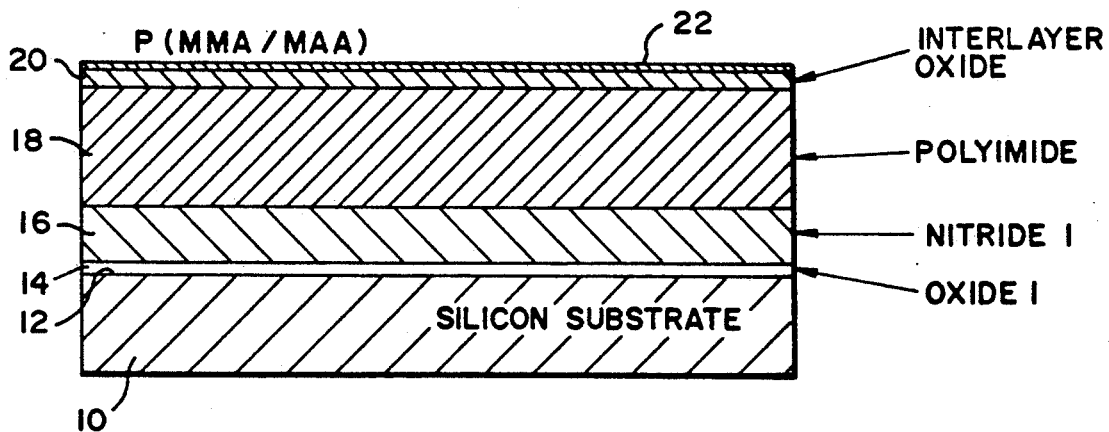
FIGS. 1a through 1i diagrammatically illustrate the process by which the cathodes of the present invention are formed.

In accordance with one embodiment of the present invention, the fabrication of self-aligned metal encapsulated silicon tip field emission cathode arrays starts with a substrate which preferably is an n-type, (100) oriented, $10^{18}$ arsenic doped silicon (5 m-ohm per cm), generally indicated at 10 in FIG. 1a, for example in the form of a wafer. The field emission tips are formed from this material in the following manner. The top surface 12 of the substrate is cleaned and a silicon dioxide layer 14, illustrated as "Oxide I" is thermally grown on surface 12 to a thickness of, for example, 90 nm, at a temperature of 900° C. The oxide layer 14 reduces the stress between the substrate 10 and a silicon nitride layer 16, identified in FIG. 1a as "Nitride I", during temperature cycles. Such stress would result because of the large difference between the thermal coefficients of expansion of nitride and silicon. The nitride layer 16 is applied to the top surface of the oxide layer 14 by low pressure chemical vapor deposition (LPCVD) to a thickness of about 400 nm and at a temperature of 850° C.

Figure 1B:
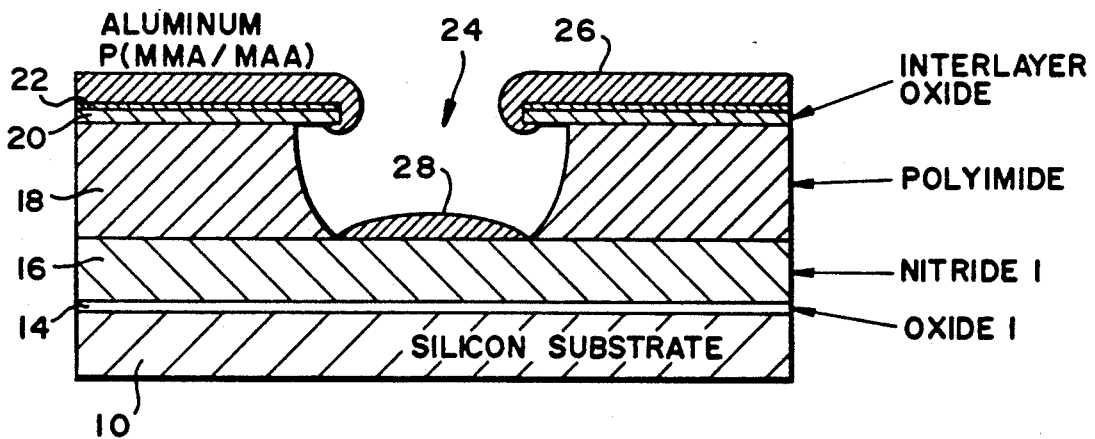

The locations and sizes of individual tip field emission cathodes are determined by lithography in a tri-layer resist material which is deposited on the nitride layer. The resist layer may include, for example, a polyimide base layer 18 which may be 800 nm thick, a plasma enhanced chemical vapor deposition (PECVD) interlayer oxide 20 having a thickness of 80 nm and a P(NMA-MAA) type I, 11% co-polymer top layer 22 having a thickness of 170 nm. Following deposition of this tri-layer resist sequence, electron beam lithography is used to expose the layer 22 to produce circles, or other shapes if non-circular emitters are desired, in any desired pattern. Preferably, and as described below, these circles are located in an array of rows and columns to provide the desired pattern of field emission cathode tips. The copolymer layer 22 is developed, and the inner layer oxide 20 is patterned using an isotropic reactive ion etch (RIE). Thereafter, the polyimide layer 18 is patterned using a high pressure oxygen (RIE) to thereby produce circular cavities such as the cavity 24 illustrated in FIG. 1b.

A 250 nm aluminum film 26 is thermally evaporated onto the top surface of layer 22 and into the cavities 24, where it is deposited onto the top surface of the nitride layer 16 to thereby form circles of aluminum, such as the circle 28, on the nitride layer. Line of sight aluminum evaporation is used, and a pattern of circles 28 is produced on nitride layer 16 in accordance with the desired pattern of the array of field emission cathodes to be produced. Thereafter, the aluminum layer 26 is removed by means of a methylene chloride lift off process which removes the resist sequence and the layer 26 of aluminum, leaving the aluminum circles 28 intact.

Figure 1C:
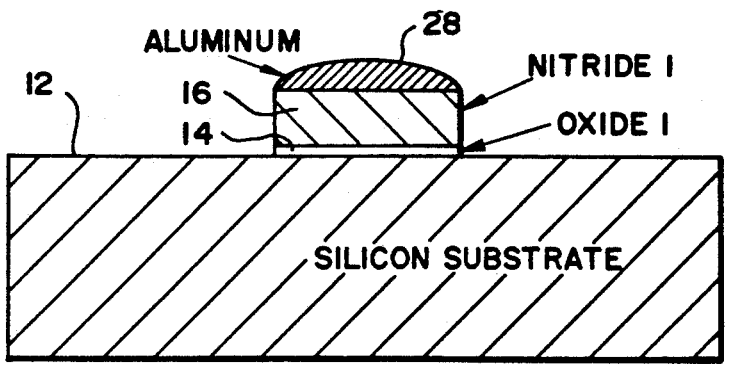

The array pattern represented by the aluminum circles 28 is then transferred to the underlying dielectric stack, consisting of nitride 16 and oxide 14, by means of an anisotropic RIE process, as illustrated in FIG. 1c. Although this figure illustrates only one aluminum circle and its dielectric stack, it will be understood that multiple circles may be provided on the top surface 12 of the substrate. Thereafter, a second anisotropic RIE process transfers the pattern to the underlying substrate silicon by etching trenches, for example, 500 nm deep, into the substrate silicon. The bottom wall of the trench is illustrated at 30 in FIG. 1d, and this trench extends between all of the dielectric stacks in the array to define upstanding cylindrical pedestals at the desired locations of the emitter.

Figure 1D:
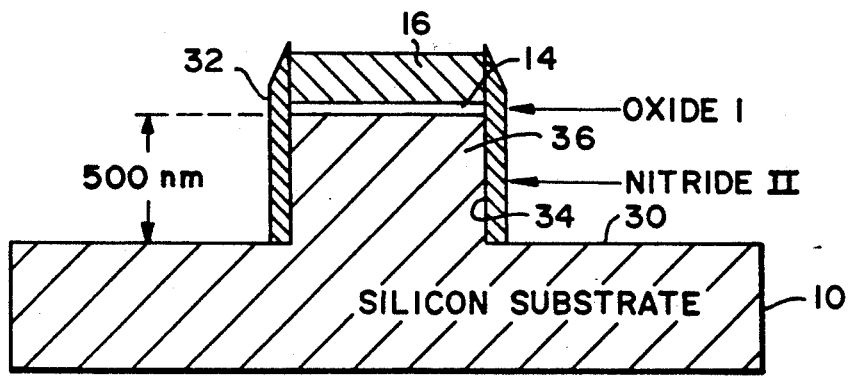

After suitable cleaning of the exposed surface of the wafer, a conformal nitride layer is deposited by low pressure chemical vapor deposition to cover all of the exposed surfaces and then is etched back by an RIE etch to expose the trench surface 30 and to leave nitride side wall spacers 32 on the cylindrical side wall 34 of each of the upstanding silicon pillars 36. The side wall spacer nitride material 32, which is illustrated in FIG. 1d as "Nitride II" is provided to prevent oxidation of the silicon pedestal 36 during the subsequent steps.

Figure 1E:
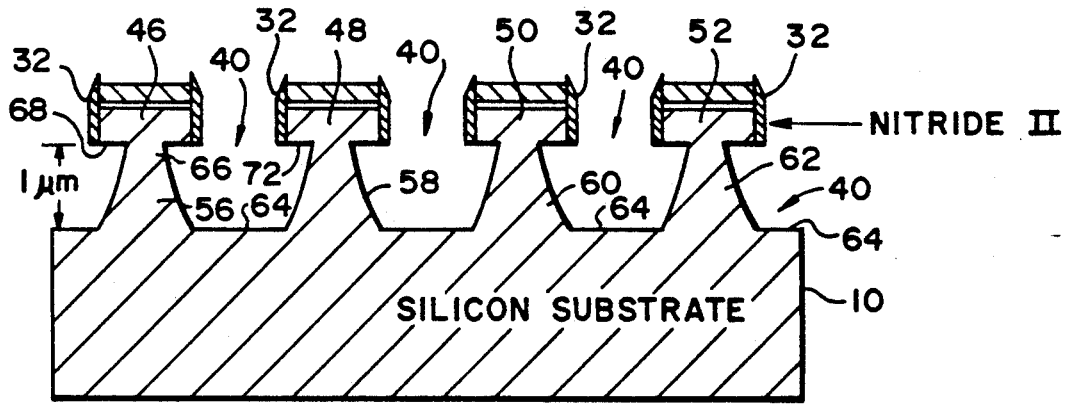

The exposed surface 30 of the silicon substrate 10 is further etched to a depth of 1 micrometer, for example, using an RIE recess etch, thereby forming recesses such as those illustrated at 40 in FIG. 1e. These recesses undercut the pedestal 36 (of FIG. 1d) below the nitride spacer 32 to form spaced, circular islands such as islands 46, 48, 50 and 52 supported above the remaining substrate 10. The islands remain connected to the substrate 10 and are supported by corresponding silicon pillars 56, 58, 60 and 62, respectively. The islands and the corresponding pillars conform in cross sectional shape to the aluminum deposition 28, and thus preferably are circular in cross section, with the pedestals 56, 58, 60 and 62 being tapered generally inwardly and upwardly. The apertures 40 surround the pillars to provide a continuous surface 64 which surrounds the islands and the supporting pillars. As illustrated, the pillars have their smallest diameter at neck portion 66, where they join the bottom wall 68 of the corresponding island.

Figure 1F:
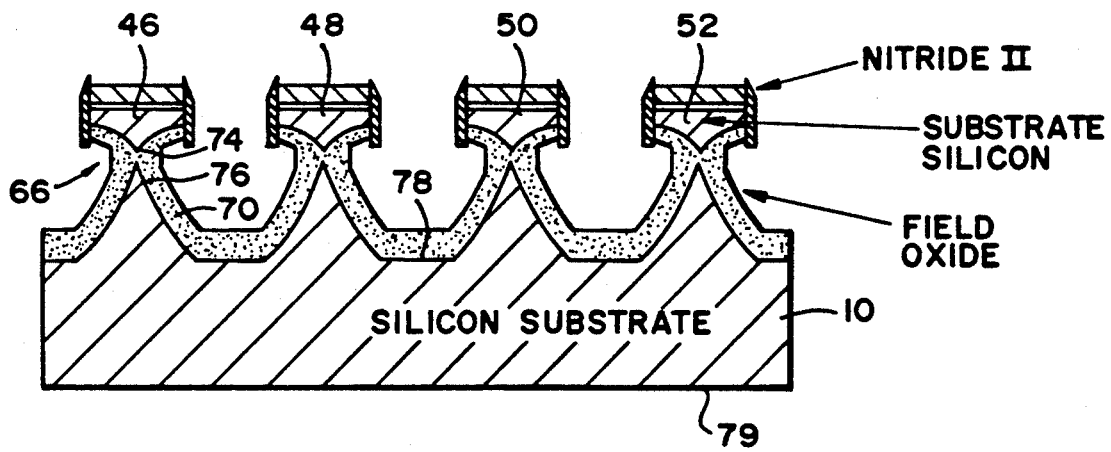

The structure of FIG. 1e is then oxidized using high temperature lateral thermal oxidation (for example at a temperature of 1100° C.) to form a layer of oxide 70, illustrated in FIG. 1f, on the exposed surfaces of the silicon material 10. The thickness of layer 70 is sufficient to oxidize all of the silicon in the region of the neck portion 66 of the pillars which support the silicon islands, and accordingly the thickness of the oxide layer will depend upon the diameter of the neck portion. Thus, for example, if the diameter of the neck portion 66 is about one micron, an oxide thickness of approximately 600 nm will be sufficient to remove all of the oxide in the area of the neck 66, silicon thereby separating the islands 46, 48, 50 and 52 from their corresponding supporting silicon pillars 56, 58, 60 and 62, and electrically isolating the islands from the underlying silicon substrate 10, as illustrated in FIG. 1f. The islands of substrate silicon are mechanically supported by the oxide layer and it has been found that the upper and lower silicon material will be defect free so long as the two parts are completely isolated by the lateral thermal oxidation which produces oxidation layer 70.

Oxidation of the silicon moves into the surface of the silicon material essentially at a constant rate, oxidizing the material inwardly at the neck 66 and the vertical side walls of the pillars, upwardly at the bottom surfaces 68 of the islands, and downwardly on the substrate surface 64, thereby reducing the size of the island 46 (for example) and reducing the diameter of the pillar 56 throughout its entire height. This oxidation shapes the bottom surface 68 of island 46 (as well as the other islands in the array) into a downwardly-facing tip 74 and shapes the pillar 56 into an upwardly-facing conical tip 76, with the tips 74 and 76 being opposed and aligned with each other. In similar manner, all of the other islands in the array, such as islands 48, 50 and 52, similarly formed opposed and aligned upper and lower tips when oxidized, with the oxide layer 70 forming the mechanical support for the silicon islands which are now electrically isolated from the underlying substrate 10. The oxidation step forms a new top surface 78 for the silicon substrate 10.

Since electrical contact to the emitting tips of the wafer will be made at the lower surface 79 of substrate 10, that surface preferably is cleaned to remove any dielectric film that might have accumulated thereon. This requires a photoresist mask to protect the top surface of the wafer, followed by an RIE etching of surface 79 and removal of the mask form the top surface of the device.

Figure 1G:
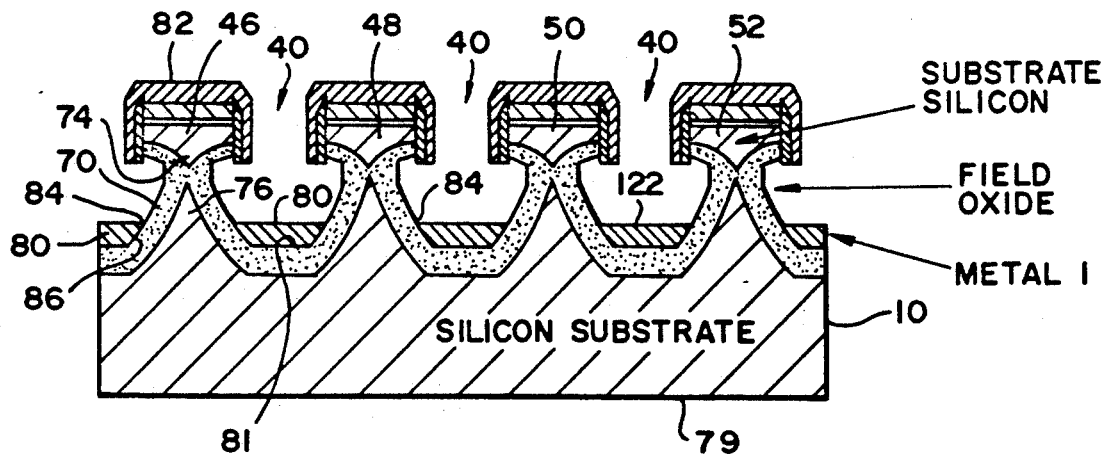

As illustrated in FIG. 1g, a gate electrode metal layer 80, identified as "Metal I", is deposited on the upper surfaces of the wafer as by line-of-sight evaporation to form a layer approximately 300 nm thick on the horizontal bottom surfaces 81 of apertures 40 surrounding the islands. In addition, the metal forms a layer 82 on the top and sides of the islands. Because of the presence of the oxide layer 70 on the surfaces of the upwardly-facing lower tips 76, and because the layer 70 is of uniform thickness, the metal layer 80 forms circular apertures around the conical tips 76 with the interior edges 86 of these apertures being spaced from the conical tips 76 by the thickness of the oxide layer. Furthermore, the interior edges 86 of these apertures are shaped to have their surfaces parallel to the adjacent surfaces of their respective tips, so that the gap between the tip and the gate electrode is constant through the thickness of the metal layer. The diameter of aperture 84 is substantially the same as the diameter of its corresponding island 46, in the illustrated example, and preferably is about 1.8 micrometers.

Figure 2:
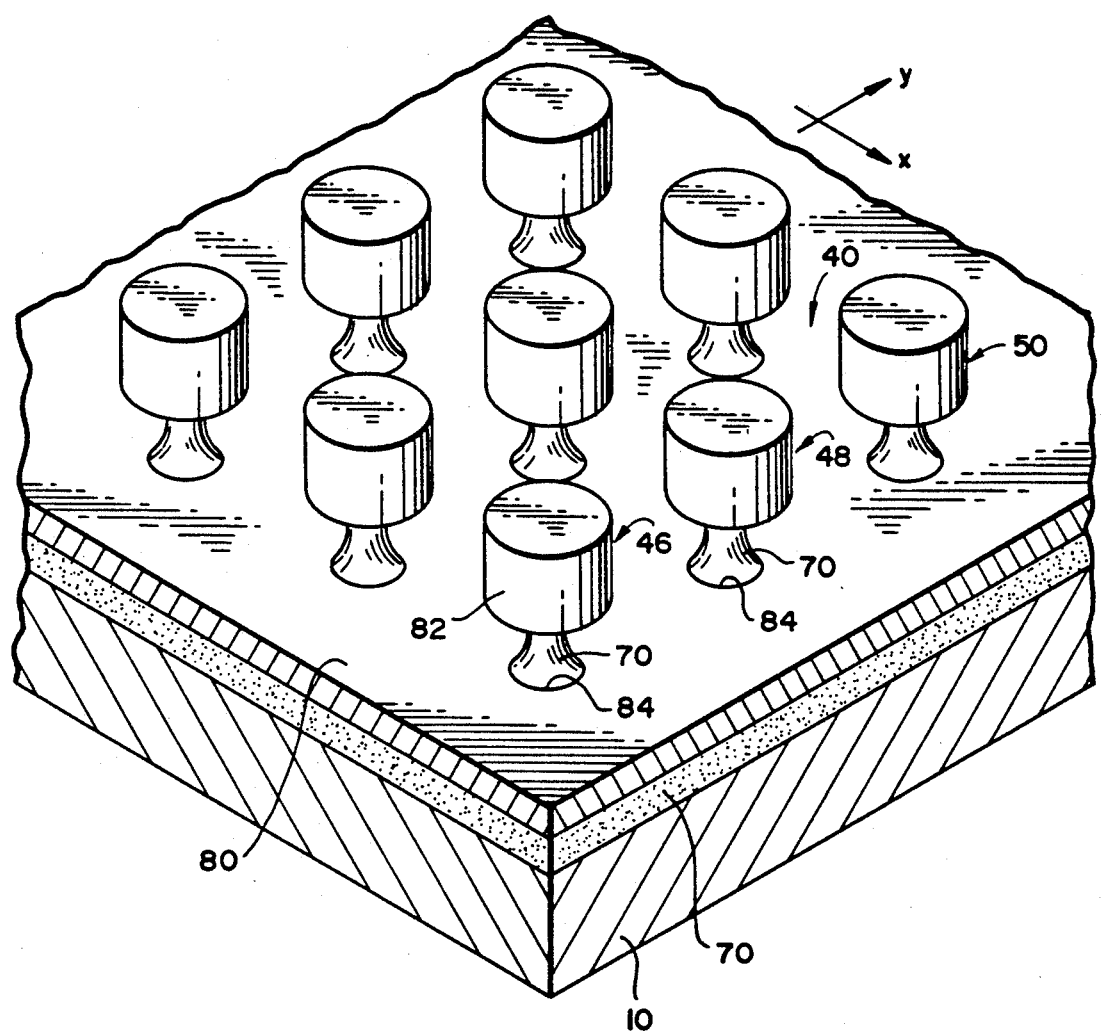
FIG. 2 illustrates a silicon-tip field emission cathode array before the removal of the dielectric cap used in the formation thereof.

FIG. 2 is a perspective and diagrammatic illustration of an array of the islands of FIG. 1g, showing the islands covered by the metal layer 82. As illustrated in this figure, the islands are supported by oxide pedestals formed by the oxide layer 70, with the gate electrode layer 80 covering the bottom of the openings 40 between the adjacent islands. The gate electrode layer 80 provides a continuous metal surface between the adjacent islands in all directions. Although the islands are shown in FIG. 2 as being arranged in rows along an X axis and columns along a Y axis, various other patterns and arrangements may be provided, as desired.

Figure 1H:
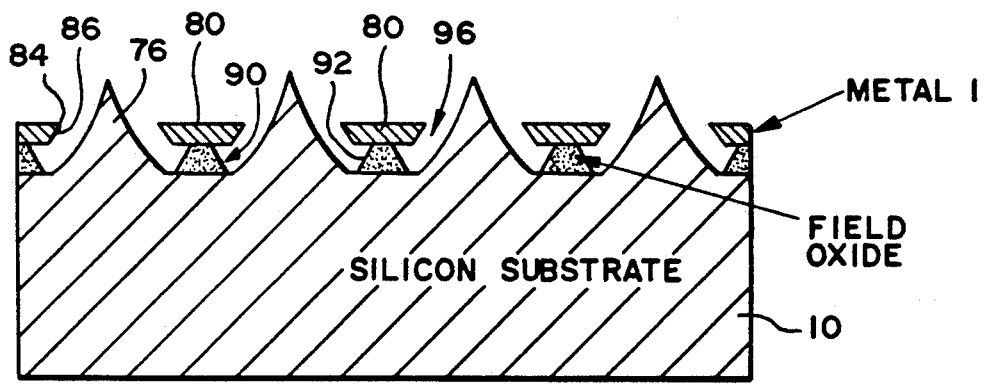

Returning to FIG. the next step in the process is the removal of the islands 46, 48, etc. and the dielectric and metal caps which the islands support. The caps are lifted off by etching the wafer in a buffered hydrofluoric acid solution to remove the oxide layer 70 around the conical tips 76, as illustrated in FIG. 1h. The etching process is continued until the oxide layer 70 is removed from the side walls of the conical tips 76 to expose the tips, and until the metal layer 80 is undercut, as illustrated at 90. This undercutting leaves an oxide support structure 92 beneath the gate electrode layer 80 to secure layer 80 to the floor 78 of the silicon substrate 10 and to hold it in position with respect to the tips 76.

Figure 3:
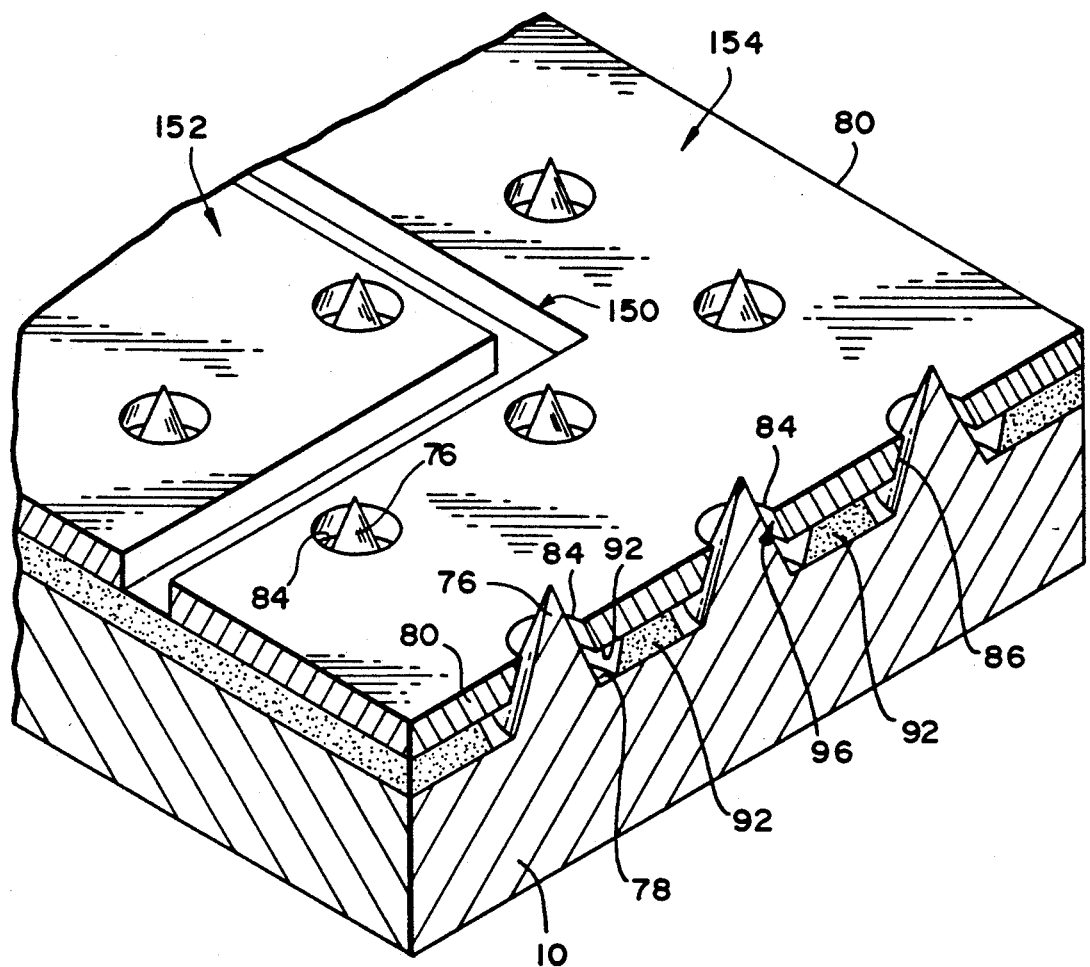
FIG. 3 is a diagrammatic perspective view of a silicon-tip field emission cathode array in partial cross-section.

FIG. 3 corresponds to FIG. 1h, showing the wafer with the islands 46, 48, etc. removed and the oxide layer removed from the tips 76. FIG. 3 also shows the undercutting of the metal layer 80 adjacent the aperture 84 surrounding the tip 76 to leave support segments 92 of the oxide in place. This support structure 92 ensures that the apertures 84 remain accurately aligned with their corresponding tips. As may be best seen in FIG. 1h, the circumferential edges 86 forming the apertures 84 are tapered upwardly and inwardly to parallel the side wall of the corresponding tip 76 so that a constant gap 96 is formed between the gate electrode metal 80 and the adjacent field emission tip.

Figure 1I:
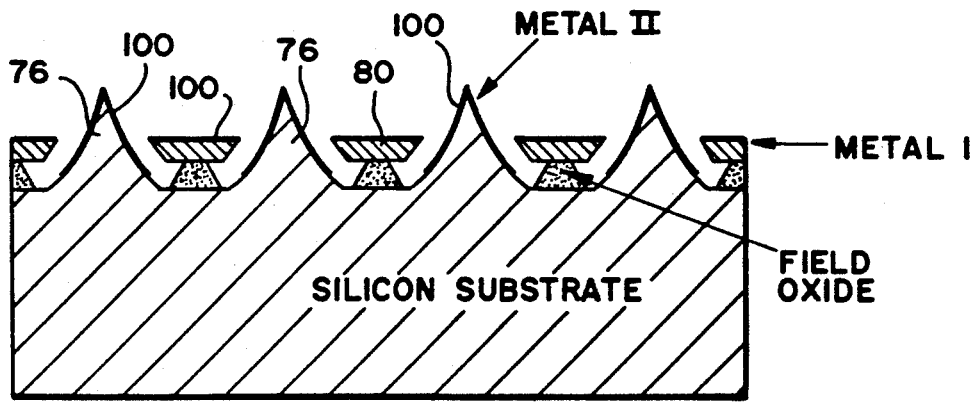

If it is desired to encapsulate the cathode tips with either a non-oxidizing metal or a metal with desirable emission characteristics, this may be accomplished in FIG. 1i by depositing, as by evaporation, for example, a suitable metal layer 100, identified in FIG. 1i as "Metal II". The undercut provided by the gate electrode 80 prevents this metal from forming a conductive path between the tips 76 and the gate electrode 80. In one embodiment of the invention, the cathode emitter tips were encapsulated with a 5 nm chrome adhesion film and 10 nm of gold.

As described above, the gate aperture 84 formed in layer 80 is approximately the same diameter as the cap formed by island 46 and its dielectric coatings, prior to the metallization step, as illustrated in FIG. 1f. If it is desired to reduce the diameter of this gate aperture, the metal layer 80 can be deposited by shadow evaporation, causing the metal 80 to be deposited on the sides of the pillars, thereby raising the level of the aperture 84 up the side wall of the oxide layer 70. Alternatively, this can be accomplished by depositing a thicker layer of the metal 80. However, the gap 96 is still determined by the thickness of layer 70.

The minimum gap 96 between aperture 84 and the side wall of tip 76 is a function of the diameter of the silicon neck portion 66, and thus of the thickness of the oxide required to form the opposing tips 74 and 76. Similarly, the minimum diameter of the aperture 84 is also a function of the diameter of the neck 66 and thus of the total thickness of the supporting neck after oxidation, but its actual diameter is dependent on its vertical location on the tapered tip.

The embodiment illustrated in FIGS. 1, 2 and 3 utilizes an essentially planar electrode layer 80, with the aperture 84 surrounding the tips 76 being in the same plane as the top surface of the electrode. However, it is often desirable to provide smaller apertures than are available with this planar arrangement. A method for doing this is illustrated in FIG. 4, to which reference is now made.

Figure 4B:
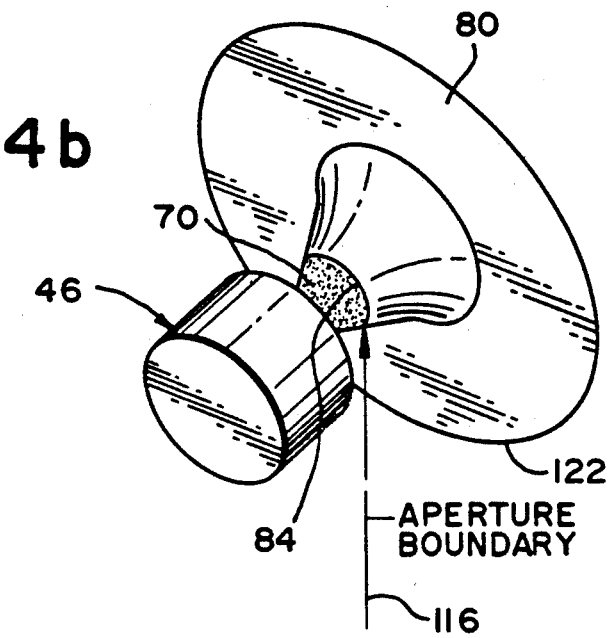
FIGS. 4a and 4b provide a diagrammatic illustration of apparatus for minimizing the gate electrode aperture.
Figure 4A:
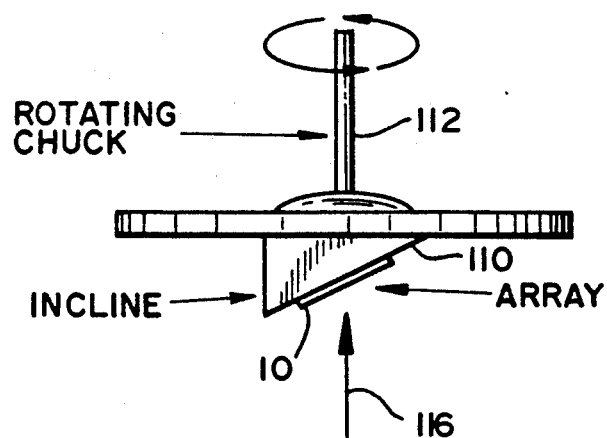

FIG. 4 illustrates apparatus for depositing the electrode metal onto the oxide layer of FIG. 1f by shadow evaporation, so as to increase the height of the tip which will be covered by the metal layer and to thereby reduce the diameter of the gate aperture. As illustrated, the substrate or wafer 10 is secured to an inclined rotatable surface 110 when the step illustrated in FIG. 1f has been completed. The inclined surface 110 is secured to a rotating chuck 112 so that the substrate can be rotated about an axis parallel to the direction of evaporation of the Metal I contained in a crucible 114, indicated by arrow 116, for deposition on the surface of the wafer. As illustrated in the enlarged view of FIG. 4b, by tilting the wafer the evaporated metal is directed onto the surface of oxide 70 where it extends upwardly along the support pillar, with the shadow effect of the island 46 determining the height to which the metal is deposited. Since the pillar is tapered, the top edge of the metal, which defines the aperture 84, is reduced in diameter, and can be reduced to about 600 nm. This deposition results in a "dimple" 120 of metal around the tip, extending above the top surface 122 of the metal layer 80.

Figure 5A:
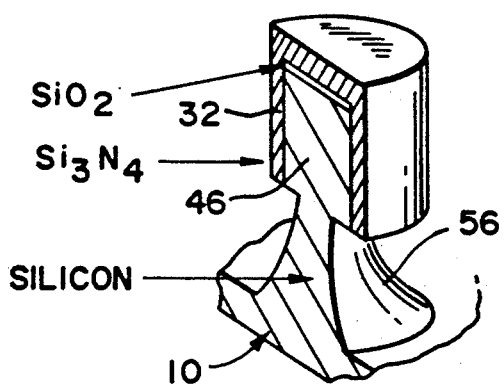
FIGS. 5a-5e illustrate a modified form of the process of the invention.
Figure 5B:
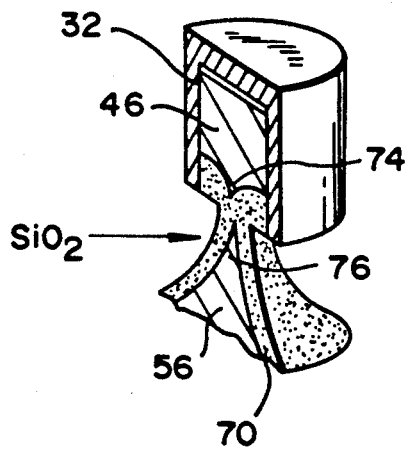
Figure 5C:
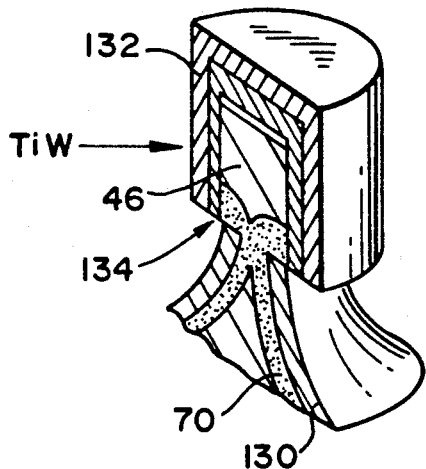

Another method for fabricating a dimpled gate electrode for the purpose of controlling the diameter of the gate aperture is illustrated diagrammatically in FIGS. 5a-d. These figures are a perspective view of structures resulting from the process steps, and are similar to the illustrations of FIG. 1. FIG. 5a is an illustration of the island and pillar structure of FIG. 1e, and is fabricated in the manner described hereinabove. Thus the structure includes an island 46 supported by a pillar 56 on a substrate 10. For simplicity of illustration, the substrate 10, the aperture 40 between adjacent islands, and the horizontal surfaces of the substrate and the oxide and metal layers thereon are not illustrated in FIGS. 5b-5e.

Covering the island 46 is the dielectric cap which includes the nitride spacer 32, as illustrated in FIG. 1d. This structure is oxidized, as in the prior embodiment of FIG. 1f, to produce the oxide layer 70 illustrated in FIG. 5b, to form upper and lower tips 74 and 76. In this embodiment, the next step, shown in FIG. 5c, includes the deposition of a metal layer 130 on the oxide 70 by sputter deposition of TiW. The sputtered metal is also deposited on the dielectric cap carried by the island 46, as indicated at 132, but the nitride spacer 32 serves to break the TiW layer at the bottom surface of the island, as indicated at 134 in FIG. 5c.

Figure 5D:
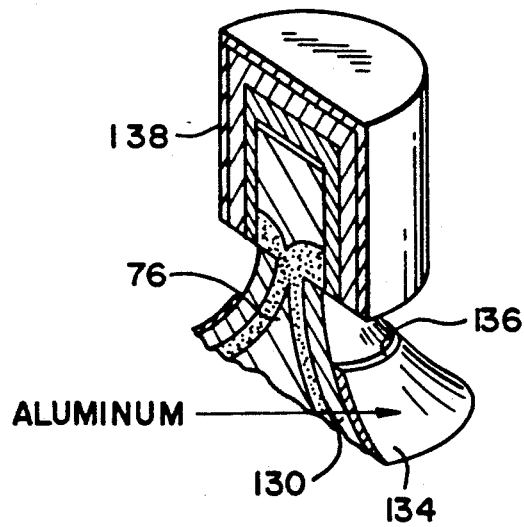

An aluminum mask 136 is evaporated onto the surface of metal layer 130, as illustrated in FIG. 5d, with the upper edge 136 of the mask defining the location of the aperture to be formed in the metal layer 130. A layer 138 of aluminum also covers the cap. The aperture is then formed by etching away the TiW near the top of the lower tip 76 with an $SF_6$ plasma etch; only the TiW not covered by aluminum is etched.

Figure 5E:
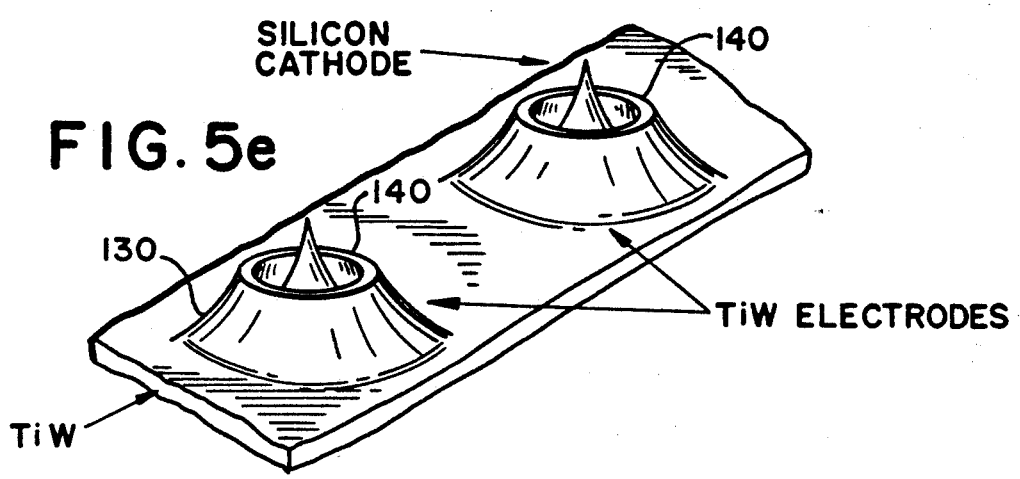

Thereafter, the oxide exposed by removal of the TiW material is etched by an HF wet chemical etch to lift off the island 46 and to expose the tip 76, leaving the dimple structure illustrated in FIG. 5e. This Figure shows two such tips, which may be part of a larger array, wherein the tips are surrounded by dimples of TiW forming the gate electrodes. These dimples are an extension of the overall electrode layer formed by the sputter deposition of TiW on the oxide layer. The dimples each form an aperture 140 having a diameter which is determined by the location of mask 134, and which is precisely aligned with the tip 76. The gap between the edge of aperture 140 and the tip is determined by the thickness of oxide layer 70, as before.

The metal gate electrode layer, such as layer 80 in FIG. 3 may be patterned to divide the array into groups of emitters, or to separate single emitters, for control purposes. Thus, for example, dividing grooves 150 can be provided in the layer 80 by means of a gate electrode mask and a metal etching step. The surface of layer 80 would be covered by, for example, an S1400-27 photoresist layer to a thickness of 1.2 μm, and the desired pattern exposed, through a suitable optical mask, as by light at 402 nm. An MF-312 photoresist develop is followed by a metal etching step to produce the groove 150 through the thickness of metal layer 80. Thereafter the photoresist layer is removed, as by an acetone/IPA photoresist strip solution, leaving the patterned metal layer. Suitable electrical connections may be made to the separate metal segments, such as segments 152 and 154, to provide suitable control voltages to corresponding emitter tips.

The vertical placement of the tip with respect to the upper surface of the gate electrode 80 can be varied by designing for different tip heights, as by lengthening the oxide step to reduce the size of tip 76. The process of the present invention permits fabrication of silicon tip microcathodes in arrays of very large numbers, with the tip to tip spacing between adjacent cathodes being in the range of 1.0 micrometers to, for example, 10 micrometers. The diameters of the tips are uniform, and may be less than 20 nanometers, with the gate electrode being self-aligned with respect to the cathode tip. The position of the cathode with respect to the gate electrode aperture strongly influences the emission characteristics, and accordingly the diameter of the aperture and its size and location with respect to the tip can be varied as desired. Cathodes with heights ranging from 500 nm to 900 nm have been fabricated and structures have been produced with cathodes having their tips below, even with, and above the top surface of the gate metal layer 80. The process of the present invention provides uniform, self-aligned encapsulation of the tip by other metals, as explained with respect to FIG. 1i, without the need for an additional masking step and without the risk of substrate-to-gate electrode shorts.

Although the present invention has been described in terms of preferred embodiments thereof, it will be apparent to those of skill in the art that numerous variations and modifications may be made without departing from the true spirit and scope thereof as set forth in the following claims.

What is claimed is:

1. A process for fabricating a densely packed microcathode field emitter array for producing high current density emissions at low voltages, comprising:
    forming from a silicon substrate a multiplicity of closely-spaced generally cylindrical islands, each island being individually supported by a corresponding tapered generally conical silicon pedestal integral with said substrate;
    laterally oxidizing the under surfaces of said silicon islands and the sides of said corresponding pedestals to form in each said silicon island and pedestal upper and lower opposed conical tips, respectively, said tips having nanometer-scale tip dimensions and wherein the lower tips are of substantially uniform height;
    controlling the oxidation of said islands and pedestals to provide a uniform layer of oxide on said lower tips and on the surface of said substrate adjacent said lower tips to produce silicon tips having diameters in the range of 20 nm;
    depositing a layer of gate electrode metal on selected portions of said oxide layer, below the level of said lower tip, deposition of said metal being limited by said island to define apertures in said metal which are axially aligned with said lower tips, said metal layer being spaced from said tips by the thickness of said oxide layer thereby providing self-aligned metal encapsulation for said oxidized lower tips; and
    etching said oxide layer to lift off said islands and their included upper tips and to remove at least a part of said layer of oxide on each said pedestal to expose at least an upper conical portion of each of said lower tips above the top surface of said metal layer, while leaving oxide support means for said gate electrode metal, whereby said gate electrode metal surrounds, is below and closely spaced to, and is accurately aligned with, said tip.

2. The process of claim 1, wherein the step of forming said islands comprises:
    defining on said substrate a multiplicity of emitter locations in a predetermined pattern;
    fabricating on said substrate at each emitter location a dielectric stack; and
    etching trenches in said substrate around each said dielectric stack to thereby form from said substrate upstanding islands.

3. The process of claim 2, wherein the step of forming said islands further includes:
    depositing an additional dielectric layer on said upstanding islands; and
    etching said substrate to deepen said trenches and to undercut said upstanding islands to provide an upwardly and inwardly tapered conical pedestal having a tapered narrow neck portion adjoining an undercut under surface on said island.

4. The process of claim 3, wherein the step of oxidizing is continued for a length of time sufficient to produce complete oxidation of said silicon in the region of said narrow neck portion to thereby isolate said silicon island from said silicon pedestal and to thereby form said upper and lower opposed tips.

5. The process of claim 3, wherein the step of etching said substrate further includes etching in regions surrounding said pedestals to produce a generally horizontal support surface around each said upstanding pedestal.

6. The process of claim 5, wherein the step of oxidizing includes oxidizing said support surface at rates to produce a substantially uniform oxide thickness thereon.

7. The process of claim 6, wherein the step of depositing includes depositing metal on said horizontal support surface oxidation, whereby said metal layer surrounds each said pedestal, the oxide layer on each said pedestal defining an aperture in said metal layer which is self-aligned with said lower tip thereof.

8. The process of claim 7, wherein the step of etching said oxide layer includes removing said layer of oxide from said pedestal to expose said tapered pedestal lower tip in the region of said aperture and to produce a gap between said metal layer and the exposed surface of said pedestal tip.

9. The process of claim 8, wherein the step of depositing said metal layer includes depositing a horizontal layer on said support surface to define a planar gate electrode for said array, and wherein the step of etching said oxide layer further includes removing at least a part of said layer of oxide on said horizontal support surface to undercut said metal layer.

10. The process of claim 7, wherein the step of depositing said metal layer further includes depositing metal on at least a lower part of the oxide layer covering said tapered pedestal to thereby form a raised metal dimple around each said pedestal, each dimple having a central aperture having a diameter dependent on the height of the dimple with respect to said lower tip.

11. The process of claim 10, wherein the step of depositing includes depositing said metal by shadow evaporation to a selected height on said pedestal to thereby define the diameter of said aperture.

12. The process of claim 11, wherein the step of etching said oxide layer includes removing at least a part of said oxide layer from said pedestal to expose said lower tip of said tapered pedestal surface and to produce a gap between said metal layer and the exposed surface of said pedestal tip.

13. The process of claim 10, wherein the step of depositing includes depositing said metal by sputter deposition on all exposed oxide surfaces.

14. The process of claim 13, wherein the step of depositing is followed by a masking step to mask and to thereby define an aperture in said metal, and further including the step of etching said metal layer through said mask to form said aperture.

15. The process of claim 14 wherein the step of etching said oxide layer includes removing oxide exposed by said masking and etching of said metal to thereby expose said tapered pedestal surface and to produce a gap between said aperture and the exposed surface of said pedestal.

16. A process for fabricating a field emitter, comprising:
    forming in a single crystal silicon substrate a generally cylindrical island individually supported by a corresponding tapered conical single crystal silicon pedestal on and integral with a support surface of the substrate;

oxidizing said pedestal to form upper and lower opposed conical tips in said island and its corresponding pedestal, respectively, to provide a uniform layer of oxide on said pedestal and lower tip and on the support surface of said substrate around said pedestal;

depositing a layer of gate electrode metal on said oxide layer, said metal being spaced from said support surface and from said pedestal and lower tip by the thickness of said oxide layer;

etching said oxide layer to lift off said island and its included upper tips, to remove said layer of oxide on said pedestal, and to remove a selected portion of said oxide on said substrate support surface to undercut said gate electrode metal while leaving an oxide support pillar for said gate electrode metal around said pedestal, whereby said gate electrode metal surrounds, is closely spaced to, and is accurately aligned with, said lower tip.

17. The process of claim 7, further including patterning said metal gate electrode layer to divide said array into electrically isolated groups of emitters.

* * * * *

UNITED STATES PATENT AND TRADEMARK OFFICE
CERTIFICATE OF CORRECTION

PATENT NO. : 5,199,917
DATED : April 6, 1993
INVENTOR(S) : MacDonald et al It is certified that error appears in the above-identified patent and that said Letters Patent is hereby corrected as shown below:

Column 1, line 4, please insert the following paragraph:

--This invention was made with Government support under Grant No. ECS-9212900, awarded by the National Science Foundation. The Government has certain rights in the invention.--

Signed and Sealed this

Twenty-first Day of June, 1994

*Attest:*

BRUCE LEHMAN

*Attesting Officer*     *Commissioner of Patents and Trademarks*